United States Patent [19]

Montague

[11] 4,095,163
[45] June 13, 1978

[54] TRANSIENT VOLTAGE SUPPRESSION CIRCUIT

[75] Inventor: Herbert R. Montague, Binghamton, N.Y.

[73] Assignee: Control Concepts Corporation, Binghamton, N.Y.

[21] Appl. No.: 692,013

[22] Filed: Jun. 1, 1976

[51] Int. Cl.² .................................................. G05F 3/00
[52] U.S. Cl. ........................................ 323/8; 307/237; 307/318; 323/22 Z; 323/81; 323/76; 328/215
[58] Field of Search ................... 323/22 Z, 81, 8, 76, 323/79; 317/16; 361/10, 11, 56, 58; 307/318, 237; 328/215

[56] References Cited

U.S. PATENT DOCUMENTS

| 3,037,129 | 5/1962 | Le Bel | 307/318 |
| 3,064,143 | 11/1962 | Sanderson | 307/318 |
| 3,373,291 | 3/1968 | Petterson et al. | 307/318 |
| 3,508,140 | 4/1970 | Moses | 323/22 Z |
| 3,978,388 | 8/1976 | Hans de Vries | 323/22 Z |

FOREIGN PATENT DOCUMENTS

| 628,715 | 2/1962 | Belgium | 323/22 Z |
| 1,179,614 | 10/1964 | Germany | 323/22 Z |
| 1,513,038 | 7/1969 | Germany | 361/56 |

Primary Examiner—Gerald Goldberg

[57] ABSTRACT

Circuit for reducing voltage oscillations created by transient pulses in the supply circuit in which a voltage-sensitive breakdown device is placed in series with the capacitor of an inductor-capacitor low pass filter. The breakdown device, having a finite threshold, provides a discontinuity in conduction during the noise pulse excursions to thereby damp any resulting oscillations.

8 Claims, 2 Drawing Figures

TRANSIENT VOLTAGE SUPPRESSION CIRCUIT

BACKGROUND OF THE INVENTION

This invention relates generally to suppression circuits for transient noise pulses and, more particularly to a circuit for interruptingly shorting such pulses across the supply.

Transient voltage spikes are common occurrences in cyclic power supply sources and create disruptive variations in the load. The usual solutions are to use capacitors and inductors as low pass filters. These, however, have the disadvantage at times, of accentuating the magnitude of the incoming transient pulse.

Accordingly, it is a primary object of this invention to provide an inexpensive, effective suppression circuit for noise pulses that is operable to reduce ringing or oscillation of the random, transient pulses at the load.

Another object of the invention is to provide a suppression circuit for transient noise pulses that is equally effective with noise pulses of either polarity.

SUMMARY OF THE INVENTION

The foregoing objects are attained in accordance with the invention by placing across the supply potential a low pass filter of the inductor-capacitor type in which the capacitor is in series with a pair of oppositely poled breakdown devices. The capacitor is selected to present a relatively high impedance to the regular cyclic frequency of the supply but presenting a relatively low impedance to noise pulses that are at significantly higher frequencies. The oppositely poled breakdown devices are effective to produce a discontinuity in the conduction of any noise pulse exceeding the rated value of the breakdown device. This permits selection of devices for the desired breakdown values. A single transient pulse usually makes both positive and negative excursions with respect to the instantaneous supply value and the breakdown devices are effective to establish a discontinuity in both directions and effectively damp or remove the oscillatory tendency in the filter.

The foregoing and other objects, features and advantages will become apparent from the following, more detailed description of a preferred embodiment of the invention, given by way of example with reference to the accompanying drawing.

DESCRIPTION OF THE PREFERRED EMBODIMENT

Figure 1:
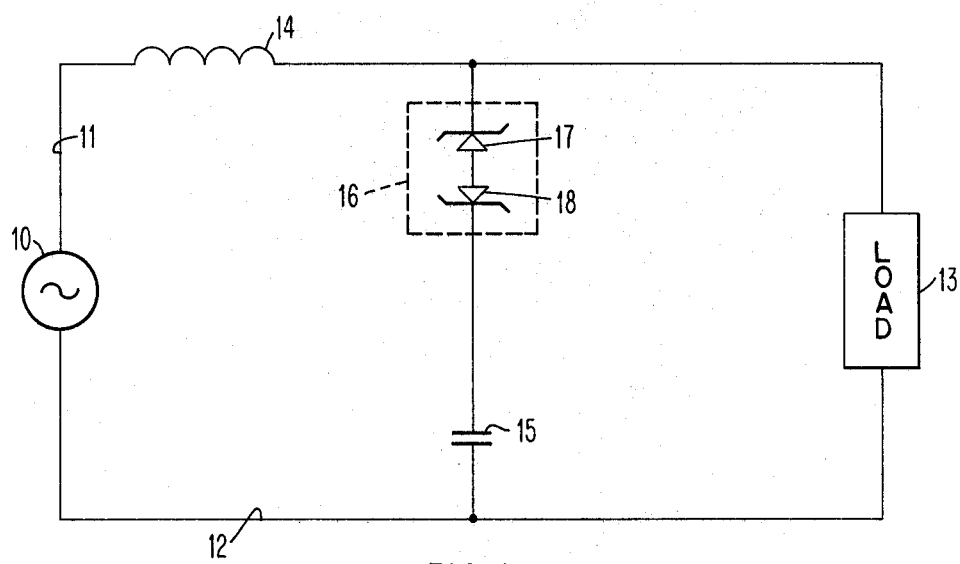
FIG. 1 is a schematic diagram of a transient voltage suppression circuit constructed in accordance with the principles of the invention.

Referring to FIG. 1, cyclic electrical source 10, such as a generator or other power or signal source, is connected via lines 11 and 12 to load 13. Connected in series with the load and one side of the source is an inductor 14, and across the source is a series circuit comprised of capacitor 15 and a device of fixed, known breakdown potential.

Figure 2:
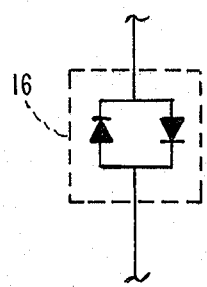
FIG. 2 is a diagram of an alternative breakdown device that may be substituted in the circuit of FIG. 1.

The breakdown device is shown as series connected, but oppositely poled Zener diodes 17 and 18. The two diodes are preferably selected with similar operating characteristics and breakdown levels, since these diodes establish the voltage levels at which conduction begins across the capacitor. Other breakdown devices such as parallel, oppositely poled rectifiers, as seen in FIG. 2, may be substituted for the zener diodes. The breakdown levels of these devices 16 are chosen appropriate to the using circuit. For example, one pair of semiconductor rectifiers such as silicon rectifiers will establish a nominal 0.6 volt conduction level. By placing two or more similarly poled silicon rectifiers in series in each parallel leg of the circuit the breakdown level can be correspondingly increased. If desired, breakdown device 16 may have uneqal breakdown levels for the two different directions of current flow. In addition, device 16 will usually have a breakdown voltage of less than the peak source voltage.

In operation, in the absence of any noise pulse, inductor 14 and capacitor 15, FIG. 1, act as a low-pass filter. Device 16 will conduct as soon as the potential across it exceeds its breakdown potential. For example, if the source is 115 volts A.C., device 16 might be chosen to have a 1.5 volt breakdown potential and would therefore be conducting soon after crossover in either direction at the reference line during each half-cycle.

Upon the occurrence of a noise pulse or spike of relatively high frequency content with respect to the source, capacitor 15 will either charge to a greater level or attempt to discharge, depending upon the polarity of the transient voltage pulse with respect to the normal power input. When the shift in potential caused by the excursions of the noise pulse nears the charge voltage of the capacitor, there is a dead band caused by the breakdown device switching out of conduction until the breakover voltage is again exceeded. This momentary blocking of conduction by device 16 prevents a rapid change in current flow and serves to more quickly damp any tendency of the filter to oscillate or ring. The oppositely-poled series Zener diodes or parallel, oppositely-poled rectifiers are effective on each successive oscillation to delay conduction sufficiently to disrupt any potential resonant alterations at the noise frequency.

While there has been shown and described a particular embodiment of the invention, it will be apparent that various modifications and improvements can be made therein without departing from the spirit and scope of the invention as defined in the appended claims.

What I claim is:

1. In a circuit having a source of varying electrical potential and a load connected across said source, a filter circuit for damping oscillations caused by transient noise pulses consisting of:

an inductor connected to one side of said source in series with said load;

a capacitor connected between the load side of said inductor and the other side of said source in parallel with said load; and breakdown means in series with said capacitor and having a predetermined breakdown potential.

2. The circuit as described in claim 1 wherein said breakdown means is a pair of oppositely-poled, series-connected Zener diodes.

3. The circuit as described in claim 1 wherein said breakdown means is connected between said load side of said inductor and said capacitor.

4. The circuit as described in claim 1 wherein said breakdown means is a plurality of oppositely-poled semiconductor devices.

5. The circuit as described in claim 1 wherein said breakdown means includes at least one pair of parallel, oppositely-poled rectifiers.

6. The circuit as described in claim 2 wherein said breakdown means includes at least one pair of semiconductor devices.

7. The circuit as described in claim 2 wherein said breakdown means has a similar predetermined breakdown potential irrespective of the direction of current flow between said inductor and capacitor.

8. The circuit as described in claim 1 wherein said breakdown voltage less than the peak value of said potential source.

* * * * *